Jan. 1, 1929.
P. A. PRIOR
MOTOR SLEIGH
Filed Nov. 20, 1925
1,697,693
3 Sheets-Sheet 1
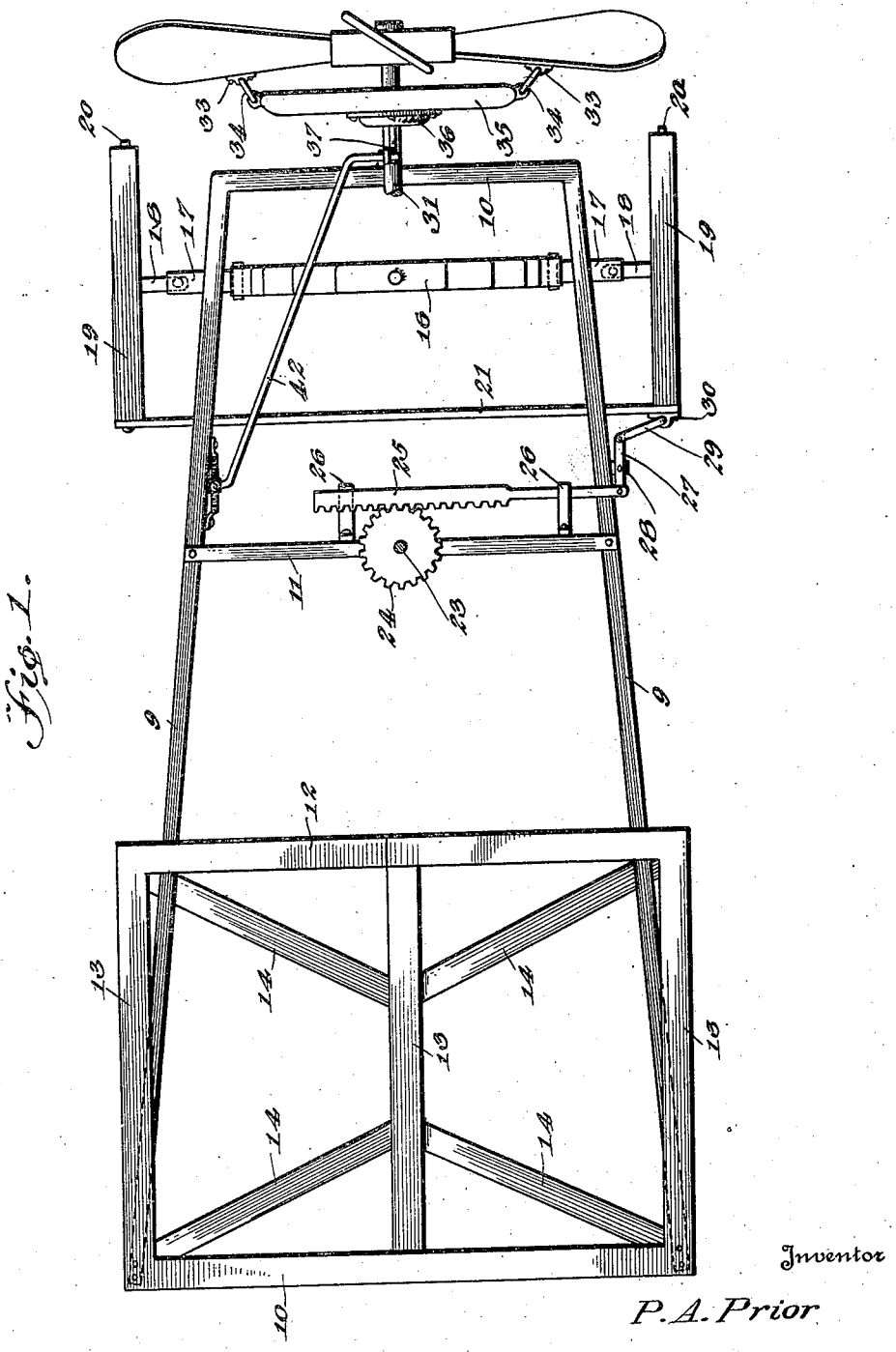
Inventor
P. A. Prior
By W. E. Beek, Jr.
Attorney

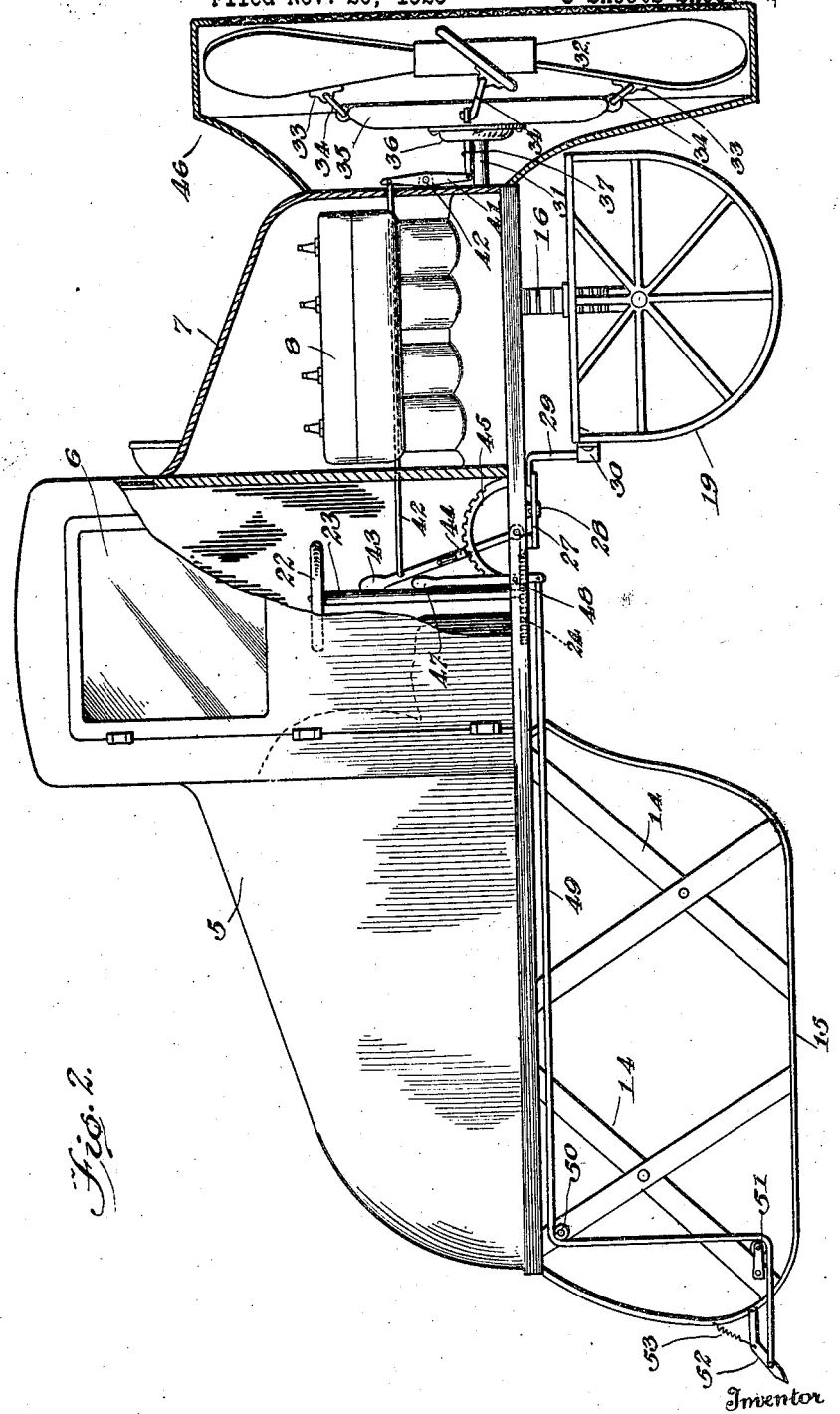

Jan. 1, 1929.  
P. A. PRIOR  
MOTOR SLEIGH  
Filed Nov. 20, 1925
1,697,693
3 Sheets-Sheet 3
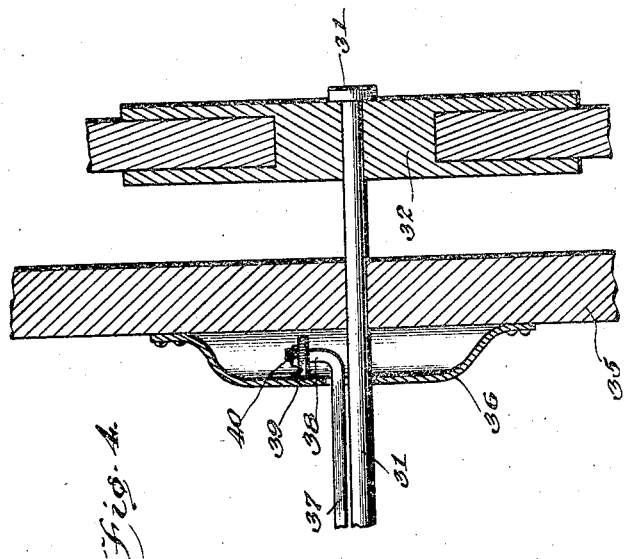
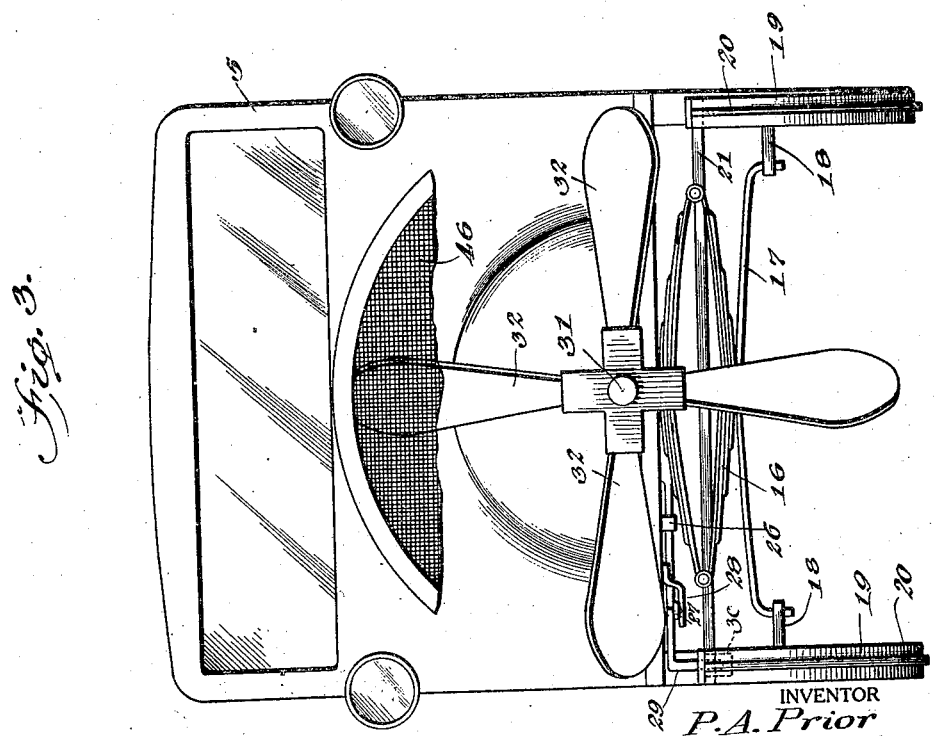
INVENTOR  
P. A. Prior  
BY  
ATTORNEY Patented Jan. 1, 1929.

1,697,693

UNITED STATES PATENT OFFICE.

PORTER A. PRIOR, OF YPSILANTI, MICHIGAN.

MOTOR SLEIGH.

Application filed November 20, 1925. Serial No. 70,300.

My invention relates generally to sleighs provided with a motor driven propeller.

An object of my invention is to provide a sleigh having a motor adapted to propel the same and a hand operated governor arranged to engage the propelling means so as to regulate the speed thereof.

A further object is to provide a motor driven sleigh having an enclosed operator's compartment and arranged for operation substantially similar to that of an automobile.

Another object is to devise a motor sleigh which is simple and cheap in construction, inexpensive to operate and extremely practical in its application to the uses for which intended.

Other objects and advantages will become apparent from the following detailed description in conjunction with the accompanying drawings forming part hereof, in which Figure 1 is a plan view of the chassis of the sleigh with the propelling means mounted thereon.

Figure 2 is a side elevational view of the device with the forward portion broken away so as to more clearly show the operating mechanism.

Figure 3 is a view showing the front of the device with a portion of the propeller guard cut away, and Figure 4 is a detail sectional view of the speed governor.

Referring now to the drawings, I have shown in Fig. 2 a motor sleigh having a body 5 including an operator's compartment 6 and a forward compartment or hood 7 covering the motor or engine 8. The body is preferably of an enclosed type to protect the operator from inclement weather and the engine and body may be of any suitable design as for instance similar to the popular styles of automobiles. The body is mounted on a chassis frame 9, comprising side members as shown in Fig. 1, and end members 10. I also provide an intermediate cross member 11, and at the rear a supporting frame comprising a cross member 12 and longitudinally extending members 13 connecting the cross member 12 with the rear chassis frame 10.

Braces 14 extend from the middle longitudinal member 13 to the rear sleigh runners or skids 15 which are secured at their ends to the chassis frame thus forming a rigid means of construction for said skids.

To the forward end of the device I provide a vehicle leaf spring 16, of a full elliptical type, the top section of which is secured intermediate its ends to the chassis frame and the bottom section having a rod 17 secured thereto and extending transversely of the device. Each end of said rod is movably attached to arms 18 carried by the forward sleigh runners or skids 19 which form an axis upon which the skids are turned for directional purposes. Ribs 20 extend circumferentially about the face of the skids to prevent side skidding. A tie rod 21 is loosely connected at each end to the rear of each front skid so that both of said skids will turn in the same direction.

I provide a steering mechanism for the sleigh comprising a steering wheel 22 carried within the operator's compartment attached on a vertical steering post 23 which is rotatably mounted upon the cross member 11. Near the lower end of the post I provide a gear wheel 24 having its teeth adapted to engage the teeth on a rack bar 25, which bar extends transversely of the sleigh and is slidably mounted on brackets 26 secured to the cross member 11. To one end of the rack bar I loosely attach one end of a rod 27, which is pivotally mounted to a support 28 secured to the side of the chassis frame 9. The other end of the rod 27 is loosely secured to one end of a link 29 which has its other end attached to a mounting 30 secured to one of the front skids. Thus it will be seen that the front skids can readily be turned by proper manipulation of the steering wheel so as to guide the sleigh in any desired direction.

The motor is provided with an extended crank shaft 31 upon the outer end of which is securely mounted a propeller 32 suitably keyed on the shaft which constitutes the means of propulsion of the sleigh. Upon the rear edge of the propeller blades I provide brackets 33 to which links 34 are loosely attached at one end. The other end of said links are attached to a circular disk 35 which is freely carried on said shaft so as to be slidable longitudinally thereon and it is thus apparent that rotation of the propeller also operates to rotate the disk. Upon the rear face of said disk I fixedly attach a bracket 36 having a central opening through which the shaft passes, said opening being of sufficient diameter to permit the insertion of an arm 37 parallel to said shaft. Said arm has provided an upturned end 38 spaced between the rear face of said disk and the inner face of said bracket. A roller 39 is rotatably mounted on the end of said arm and secured thereon by a nut 40, said roller being adapted to engage the inner face of said bracket as illustrated in Fig. 4.

The arm 37 has its other end loosely connected to one end of a rod 41 which is pivotally mounted intermediate its ends to a support 42 secured to the forward portion of the hood 7. The opposite end of the rod 41 is loosely connected to a rod 42 which extends rearwardly to within the operator's compartment and is there secured to a lever 43, the lower end of which is pivotally secured to the frame of the device.

By this construction it will readily be observed that the speed of rotation of the propeller can be governed by the operation of the lever 43; that is movement rearwardly of said lever will cause the roller 39 to lie disengaged with the inner face of the bracket 36, while a movement forwardly of the lever will cause a rearward pull on the arm 37 so as to frictionally engage the roller and the inner face of the bracket and of course the greater the exertion placed at the lever the greater the amount of friction which will occur against the rotation of the propeller. In order to be able to maintain the parts in any desired relation I provide a dog 44, attached to the lever 43 in engagement with a ratchet 45 suitably mounted for this purpose.

A guard 46 is mounted at the forward end of the device for enclosing the propeller and associated mechanism, the front of said guard being formed of screening so that a proper amount of air will be provided for the propeller.

A brake lever 47 is also provided within the operator's compartment and is pivotally mounted to the chassis intermediate its ends as at 48. One end of said lever extends beneath the floor of said compartment and has secured thereto a cable 49 which extends rearwardly about a pulley 50 located near the rear of the sleigh and downwardly about a second pulley 51, mounted upon the lower end of one of the braces 14 and is then connected to a spike or drag 52. One end of said spike is loosely attached to the rear of the sleigh skid 15 and is normally held upwardly out of engagement with the surface of the snow or ice by a coil spring 53 which is also connected to the said skid. The spike is of sufficient length so that when it is desired to retard the momentum of the sleigh or cause the same to stop the lever 47 can be pulled by the operator whereby the spike is drawn downwardly into engagement with the surface of the snow or ice, the end of the spike being sharpened so as to dig into the surface thus providing a quick and positive braking element. However the braking mechanism can also be constructed so as to substitute a foot pedal in place of the hand lever, the apparatus being readily adaptable for carrying out the necessary minor changes for this purpose.

While I have illustrated a preferred form of my invention it will be understood that the construction shown is susceptible of various modifications and I therefore claim as my own all such modifications and adaptations to which I am entitled without departing from the spirit of the invention or the scope of the appended claims.

I claim:—

1. Vehicle drive means comprising, a power device having a shaft extending forwardly thereof, a propeller rotatably mounted on said shaft, a disk also rotatably mounted on said shaft and having a bracket secured thereto, links connecting said propeller to said disk, a roller adapted to engage said bracket and a lever carried by said body whereby the said roller may be thrown into and out of engagement with said bracket.

2. Vehicle drive means comprising, a power device having a rotatable shaft extending forward thereof, a propeller fixedly secured to said shaft, a disk arranged upon said shaft between said power device and said propeller, means connecting said disk to said propeller, a plate secured to one face of said disk and having its center spaced apart therefrom, an opening in said plate for receiving said shaft, an arm parallel to said shaft and extending through said opening and having an upturned end, means carried thereby adapted to engage the inner face of said plate, a rod connected to said arm and extending rearwardly of the power device and an operating lever attached to said rod as and for the purposes set forth.

3. Vehicle drive means comprising, a power device having a rotatable shaft extending forward thereof, a propeller fixedly secured to said shaft, a disk arranged upon said shaft between said power device and said propeller, means connecting said disk to said propeller, a plate secured to one face of said disk and having its center spaced apart therefrom, an opening in said plate for receiving said shaft, an arm parallel to said shaft and extending through said opening and having an upturned end, a roller carried on said upturned end and adapted to engage the inner face of said plate, a rod connected to said arm and extending rearwardly of the power device and a lever attached to said rod and adapted to force said roller into and out of frictional engagement with said plate.

4. A device of the character described comprising a power plant having a drive shaft extending forwardly thereof, propelling means secured to said shaft, propeller braking means slidably carried on said shaft and means connecting the propelling means to the braking means for rotation therewith.

5. A device of the character described comprising a power plant having a drive shaft extending forwardly thereof, a propeller secured to said shaft, an annular member slidably carried on said shaft, means connecting the blades of said propeller to the periphery of said annular member for rotation therewith and propeller braking means operatively attached to said annular member.

In testimony whereof I affix my signature.

PORTER A. PRIOR.